United States Patent
Keskula et al.

[19]

[11] Patent Number: 6,159,626
[45] Date of Patent: Dec. 12, 2000

[54] FUEL CELL SYSTEM LOGIC FOR DIFFERENTIATING BETWEEN RAPID AND NORMAL SHUTDOWN COMMANDS

[75] Inventors: Donald H. Keskula, Webster, N.Y.; Tien M. Doan, Columbia, Md.; Bruce J. Clingerman, Palmyra, N.Y.

[73] Assignee: General Motors Corporation, Detroit, Mich.

[21] Appl. No.: 09/345,139

[22] Filed: Jul. 6, 1999

[51] Int. Cl.$^7$ .................................................. H01M 8/04
[52] U.S. Cl. ........................... 429/22; 429/23; 429/13; 429/24; 429/12
[58] Field of Search ................... 429/12, 13, 22, 429/23, 24, 25

[56] References Cited

U.S. PATENT DOCUMENTS

| | | |
|---|---|---|
| 4,128,700 | 12/1978 | Sederquist . |
| 4,293,315 | 10/1981 | Sederquist . |
| 4,555,454 | 11/1985 | Shuster . |
| 4,642,272 | 2/1987 | Sederquist . |
| 4,650,727 | 3/1987 | Vanderborgh et al. . |
| 4,659,634 | 4/1987 | Struthers . |
| 4,670,359 | 6/1987 | Beshty et al. . |
| 4,678,723 | 7/1987 | Wertheim . |
| 4,816,353 | 3/1989 | Wertheim et al. . |
| 4,923,768 | 5/1990 | Kaneko et al. . |
| 4,994,331 | 2/1991 | Cohen . |
| 5,154,986 | 10/1992 | Takechi et al. ........................ 429/23 |
| 5,170,124 | 12/1992 | Blair et al. ........................ 324/434 |
| 5,248,567 | 9/1993 | Amemiya et al. . |
| 5,271,916 | 12/1993 | Vanderborgh et al. . |
| 5,272,017 | 12/1993 | Swathirajan et al. . |
| 5,316,871 | 5/1994 | Swathirajan et al. . |
| 5,372,617 | 12/1994 | Kerrebrock et al. . |
| 5,429,886 | 7/1995 | Struthers . |
| 5,484,577 | 1/1996 | Buswell et al. . |
| 5,484,666 | 1/1996 | Gibb et al. . |
| 5,518,705 | 5/1996 | Buswell et al. . |
| 5,518,828 | 5/1996 | Senetar . |
| 5,554,453 | 9/1996 | Steinfeld et al. . |
| 5,605,770 | 2/1997 | Andreoli et al. . |
| 5,637,415 | 6/1997 | Melster . |
| 5,702,838 | 12/1997 | Yasumoto et al. . |
| 5,763,113 | 6/1998 | Melster et al. . |
| 5,789,091 | 8/1998 | Wozniczka et al. . |

OTHER PUBLICATIONS

Szaniszlo, "The Advanced Low–Emissions Catalytic–Combustor Program: Phase I—Description and Status," ASME #79–GT–192 (Mar. 1979) as per document*.
Krill et al., "Catalytic Combustion for System Applications," ASME #79–HT–54 (Aug.1979) as per document*.
Hall et al., "A Porous Media Burner for Reforming Methanol for Fuel Cell Powered Electric Vehicles," SAE Paper #950095 (Feb. 3, 1995) as per document*.
Natural Gas Power Plant System (a descriptive drawing) not date available*.

*Primary Examiner*—Stephen Kalafut
*Assistant Examiner*—Raymond Alejandro
*Attorney, Agent, or Firm*—Anthony Luke Simon

[57] ABSTRACT

A method of controlling the operation of a fuel cell system wherein each shutdown command for the system is subjected to decision logic which determines whether the command should be a normal shutdown command or rapid shutdown command. If the logic determines that the shutdown command should be a normal shutdown command, then the system is shutdown in a normal step-by-step process in which the hydrogen stream is consumed within the system. If the logic determines that the shutdown command should be a rapid shutdown command, the hydrogen stream is removed from the system either by dumping to atmosphere or routing to storage.

22 Claims, 2 Drawing Sheets

FUEL CELL SYSTEM LOGIC FOR DIFFERENTIATING BETWEEN RAPID AND NORMAL SHUTDOWN COMMANDS

CROSS REFERENCE TO CO-PENDING APPLICATION

This application discloses subject matter which is disclosed and claimed in co-pending U.S. patent application Ser. No. 09/358,080, filed in July, 1999 in the names of David J. Hart-Predmore and William H. Pettit, and entitled "Methanol Tailgas Combustor Control Method," the entire contents of which are incorporated by reference.

STATEMENT OF GOVERNMENT SUPPORT

The Government of the United States of America has rights in this invention pursuant to Agreement No. DE-AC02-90CH10435 awarded by the U.S. Department of Energy.

FIELD OF THE INVENTION

This invention relates to a fuel cell system and more particularly to a system having a plurality of cells which consume an $H_2$-rich gas to produce power from the vehicle propulsion.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context. A group of cells with the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, in admix with a proton conductive resin. The catalytic particles are typically costly precious metal particles. These membrane electrode assemblies which comprise the catalyzed electrodes are relatively expensive to manufacture and require certain controlled conditions in order to prevent degradation thereof.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide. The reforming reaction is an endothermic reaction that requires external heat for the reaction to occur.

Fuel cell systems which process a hydrocarbon fuel to produce a hydrogen-rich reformate for consumption by PEM fuel cells are known and are described in co-pending U.S. patent application Ser. Nos. 08/975,442 and 08/980,087, filed in November, 1997, and U.S. Ser. No. 09/187,125, filed in November, 1998, and each assigned to General Motors Corporation, assignee of the present invention. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

It is, of course, necessary especially in vehicle applications, to periodically shutdown the system. The shutdown may be a normal shutdown as, for example, upon stopping the associated vehicle, or may comprise a rapid shutdown as, for example, when an abnormality is detected in the system that might result in degradation of the system if the system is not immediately shutdown. It is in general desirable in terms of system efficiency and system stresses to shut down the system in a normal manner. Conversely, it is imperative in terms of preventing system degradation to shutdown the system on a rapid basis when there are concerns with respect to system degradation. It is therefore imperative in a successful, efficient fuel cell system that shutdown be conducted on a normal basis wherever possible, but it is equally important that the system be shutdown on an immediate, rapid basis when conditions demand.

SUMMARY OF THE INVENTION

The invention relates to a method of controlling the operation of a fuel cell system having a fuel processor which supplies a hydrogen-rich stream to a stack of fuel cells wherein the hydrogen stream reacts with oxygen to supply electrical power to an external load.

According to the invention methodology, a normal shutdown procedure is established for the system in which the load is disconnected from the fuel cell stack; a rapid shutdown procedure is established for the system in which the hydrogen stream is removed from the system; monitoring means are provided for the system which are operative to generate system shutdown commands; shutdown decision logic is provided receiving the shutdown commands and operates to subject the shutdown commands to shutdown logic to generate either a normal shutdown or a rapid shutdown command; and the normal shutdown procedure is implemented in response to generation of a normal shutdown command and the rapid shutdown procedure is implemented in response to generation of a rapid shutdown command.

This arrangement enables the monitoring system to readily and efficiently determine with respect to any shutdown command whether rapid shutdown is required or whether a normal shutdown would be adequate.

According to a further feature of the invention, the step of subjecting the shutdown commands to shutdown decision logic comprises subjecting the commands to a plurality of criterion, each corresponding to a rapid shutdown scenario. This arrangement provides a simple and efficient means of differentiating between a rapid shutdown and a normal system shutdown.

According to a further feature of the invention, one rapid shutdown criterion comprises comparing the electrical power being supplied to the external system load to a reference power related to the capacity of the system to consume hydrogen. This arrangement insures that the system will not be overloaded with unconsumed hydrogen with resultant potential degradation of the system.

According to a further feature of the invention, the system includes a combustor receiving exhaust from the fuel cell stack and a reference voltage related to the capacity of the combustor to process the exhaust gases being received from the fuel cell stack. This arrangement insures that the exhaust from the fuel cell stack is within the capacity of the combustor whereby to avoid degradation of the combustor or the entire fuel cell.

According to a further feature of the invention, the monitoring means includes means diagnosing conditions of the system and generating diagnostic signals in response to sensed major system abnormalities, and one rapid shutdown scenario criterion comprises checking for the presence of diagnostic signals indicative of major system abnormalities. This arrangement insures that the system will be shutdown on a rapid basis whenever a major system abnormality is diagnosed.

According to a further feature of the invention, one rapid shutdown criterion includes monitoring the temperature of the fuel cell stack and determining if the shutdown command occurs before the fuel cell stack has reached a predetermined normal operating temperature. A rapid shutdown command (which might be instigated, for example, by the operator of the associated vehicle) occurring before the fuel cell stack has reached a predetermined normal operating temperature is indicative of the fact that the operator has sensed an undesirable condition).

According to a further feature of the invention, the step of removing the hydrogen stream from the system during a rapid shutdown comprises dumping the hydrogen stream to atmosphere. This arrangement removes the hydrogen stream immediately and effectively from the system and precludes system degradation. As an alternate, the step of removing the hydrogen stream from the system in a rapid shutdown scenario may comprise routing the hydrogen stream to a storage facility. Again, this has the effect of quickly and effectively removing the hydrogen stream from the system to preclude degradation to the system.

BRIEF DESCRIPTION OF THE DRAWING

The various features, advantages and other uses of the present invention will become more apparent by referring to the following description and drawings in which.

DETAILED DESCRIPTION OF THE PREFERRED EMBODIMENTS

Figure 1:
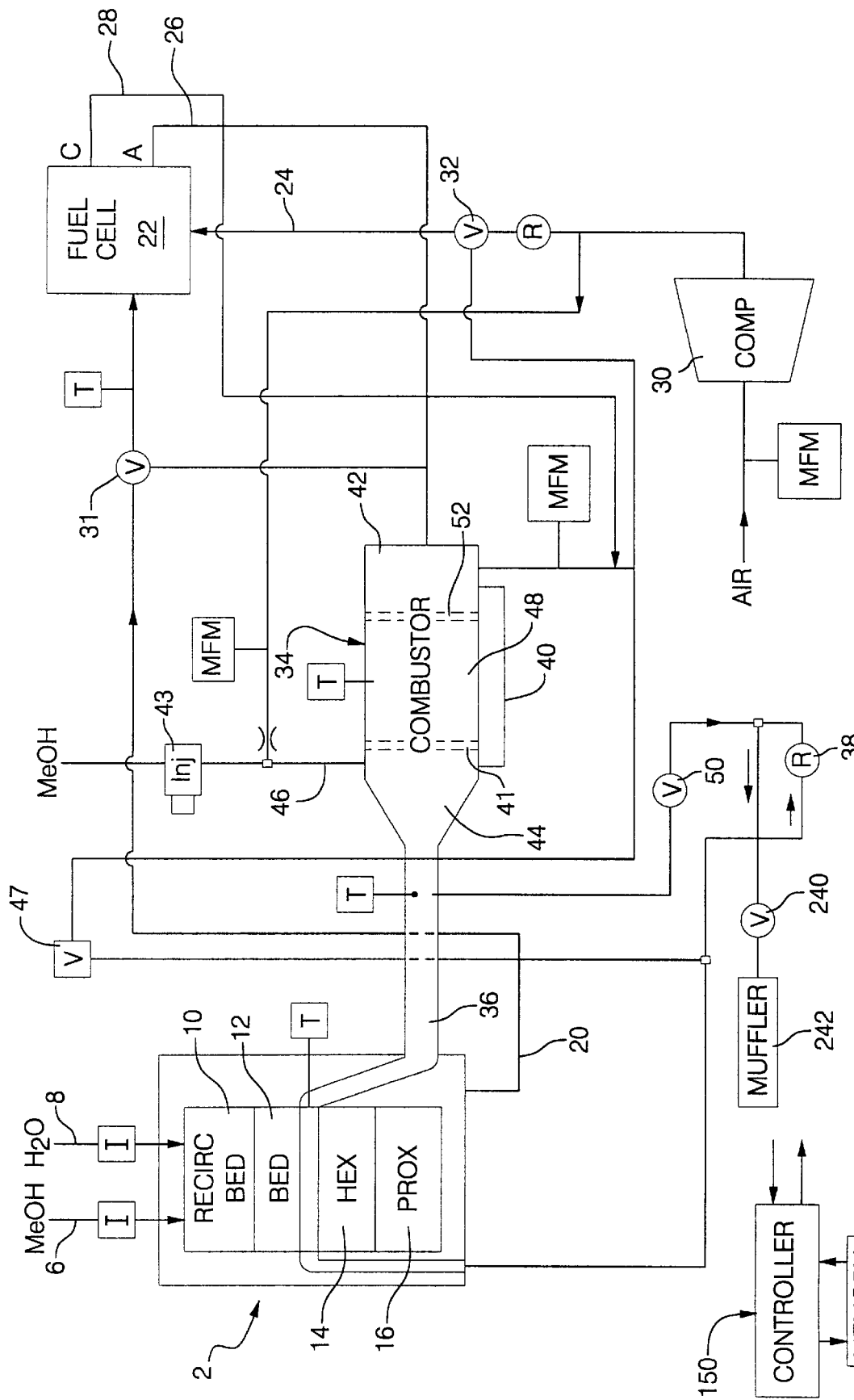
FIG. 1 is a flow diagram depicting a fuel cell apparatus which can utilize the fuel cell stack monitoring control method of the present invention.

The fuel cell system seen in FIG. 1 may be used, for example, in a vehicle (not shown) as an energy source for vehicle propulsion. In the system, a hydrocarbon is processed, for example, by reformation and gas shift reaction and preferential oxidation processes to produce a reformate gas which has a relatively high hydrogen content on a volume basis. Therefore, reference to hydrogen-rich, or relatively high hydrogen content, refers to such content on a volume basis which is a quantity interchangeable with molar basis to express relative amounts of constituents.

The invention is hereafter described in the context of a fuel cell fueled by a reformate prepared from methanol (MeOH). However, it is to be understood that the principles embodied herein are equally applicable to fuel cells generally, regardless of the fuel or hydrogen source used. There are other reformable hydrocarbon and hydrogen-containing fuels such as ethanol or gasoline, which are used to produce hydrogen.

As shown in FIG. 1, a fuel cell apparatus includes a fuel processor 2 for catalytically reacting methanol from a methanol stream 6 and water or steam from a water stream 8 in a recirculating bed 10 and a catalytic bed 12 to form a hydrogen-rich reformate gas stream. A heat exchanger 14 is interposed between the catalytic bed 12 and a preferential oxidation (PrOx) reactor 16. The reformate output gas stream comprises primarily $H_2$ and $CO_2$, but also includes $N_2$, CO and water. The reformate stream passes through the preferential oxidation (PrOx) reactor 16 to reduce the CO-levels therein to acceptable levels (i.e., below 20 ppm). The $H_2$ rich reformate 20 is then fed through valve 31 into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by a compressor 30 and is directed to the fuel cell 22 by a valve 32 under normal operating conditions. During start-up, however, the valve 32 is actuated to provide air to the input of a combustor 34 used to heat the fuel processor 2, as will be described in more detail hereinafter.

Heat from the heat exchanger 14 heats the catalyst bed(s) 10 and 12 in the fuel processor 2 and also heats the PrOx 16 during start up. In this regard, the $H_2O$-MeOH mixture supplied to the fuel processor 2 will be vaporized and preferably be recirculated/refluxed several times (e.g., 20×) through the recirculating bed 10 in the fuel processor 2, the heat exchanger side of the bed 12, the PrOx 16 and the heat exchanger 14 such that the mixture also functions as a heat transfer medium for carrying heat from the heat exchanger 14 into the beds 10 and 12 of the fuel processor 2 and to the PrOx 16.

The heat exchanger 14 itself is heated from exhaust gases 36 exiting the catalytic combustor 34. The gases 36 exiting the heat exchanger 14 are still hot and could be passed through an expander, not shown, which could drive the compressor 30 or utilized in another manner. In the present implementation, as shown in FIG. 1, the exhaust gases from the fuel processor 2 pass through a regulator 38, a shutoff valve 240 and a muffler 242 before being dumped to atmosphere.

MeOH vapor 40 emanates from a vaporizer 41 nested in the exhaust end 44 of the combustor 34. The vaporizer 41 is a heat exchanger that extracts heat from the combustor 34 exhaust to vaporize a first fuel stream, such as liquid MeOH 46 provided to the vaporizer 41 by fuel metering device 43 from the vehicle's fuel tank. The MeOH vapor 40 exiting the vaporizer 41 and the anode effluent 26 are reacted in a catalyst section 48 of the combustor 34 lying intermediate the inlet and exhaust ends 42 and 44 respectively of the combustor 34. Oxygen is provided to the combustor 34 either from the compressor 30 (i.e., via valve 32) or from a second air flow stream, such as a cathode effluent stream 28 depending on system operating conditions. A valve 50 permits dumping of the combustor exhaust 36 to atmosphere when it is not needed in the fuel processor 2.

Further details concerning the construction of the combustor 34 can be had by referring to pending U.S. patent applications Ser. Nos. 08/975,422 and 08/980,087 filed in the name of William Pettit in November 1997, the entire contents of which are incorporated herein by reference.

An electric heating element 52 is provided upstream of the catalyst bed 48 in the combustor 34 and serves to vaporize the liquid fuel 46 entering the combustor 34, heat the gas entering the bed 48 as well as preheating the bed 48 during start-up of the combustor 34. The heating element 52 may or may not be catalyzed. After start-up, as described hereafter, the electric heater 52 is no longer required since the fuel will be vaporized by the exhaust gases emanating from the exhaust end 44 of the combustor 34. A preferred electric heater 52 comprises a commercially available, uncatalyzed extruded metal monolith resistance element such as is used to light off the catalyst of a catalytic converter used to treat IC engine exhaust gases.

The exhaust end 44 of the combustor 34 includes a chamber that houses the vaporizer 41 which is a coil of metal tubing which is used to vaporize liquid fuel to fuel the combustor 34. More specifically, under normal post-start-up conditions, air or cathode effluent 28 may be introduced into the inlet end of the coil and mixed with liquid fuel sprayed into the inlet end via a conventional automotive type fuel injector. The airborne atomized fuel passes through the several turns of the heated coil tube, and therein vaporizes and exits the tube at an outlet which is located in the cathode effluent supply conduit. This vaporized first fuel stream supplements a second fuel stream or anode effluent 26 as fuel for the combustor 34 as may be needed to meet the transient and steady state needs of the fuel cell apparatus. The vaporizer coil is sized to vaporize the maximum flow rate of fuel with the minimum combustor exhaust flow rate, and is designed to operate at temperatures exceeding the autoignition temperature of the MeOH-air mixture therein throughout its fuel operational range. Autoignition within the vaporizer is avoided, however, by insuring that the velocity of the mix flowing through the coil significantly exceeds the worst-case flame speed of the mixture which varies with the composition of the inlet streams.

The amount of heat demanded by the fuel processor 2 which is to be supplied by the combustor 34 is dependent upon the amount of fuel input and ultimately the desired reaction temperature in the fuel processor 2. To supply the heat demand of the fuel processor 2, the combustor 34 utilizes all anode exhaust or effluent and potentially some liquid fuel. Enthalpy equations are used to determine the amount of cathode exhaust or air to be supplied to the combustor 34 to meet the desired temperature requirements of the combustor 34 and ultimately to satisfy the fuel processor 2. The oxygen or air provided to the combustor 34 includes one or both of cathode effluent exhaust 28 which is typically a percentage of the total oxygen supplied to the cathode of the fuel cell 22 and a compressor output air stream depending on whether the apparatus is operating in a start-up mode wherein the compressor air stream is exclusively employed or in a run mode using the cathode effluent 28 and/or compressor air. In the run mode, any total air, oxygen or diluent demand required by the combustor 34 which is not met by the cathode effluent 28 is supplied by the compressor 30 in an amount to balance the enthalpy equations to reach the desired reaction temperature within the combustor 34 so as to supply the amount of heat required by the fuel processor 2 at the desired temperature. The air control is implemented via an air dilution valve 47 which is a stepper motor driven valve having a variable orifice to control the amount of bleed-off of cathode exhaust supplied to the combustor 34.

The fuel cell apparatus operates as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34 as well as the input end of the vaporizer 41; (3) liquid fuel 46 (e.g., MeOH) is injected into the inlet end of the vaporizer 41 via a fuel injector, and atomized as fine droplets with the air flowing therein; (4) the air-MeOH droplet mix exits the vaporizer 41 and mixes with compressor air introduced into the combustor 34, and is then introduced into the input end 42 of the combustor 34; (5) the mix passes through a flame arrestor in the front of the combustor 34; (6) the mix is then heated by the heater 52 to vaporize the liquid droplets and heat the mixture; (7) the preheated vaporous mix then enters a mixing-media bed for still further intimate mixing before contacting the light-off catalyst bed; (8) upon exiting the mixing-media bed, the mix begins oxidizing on the light-off catalyst bed just before it enters a primary catalyst bed 48, or reacting section of the combustor 34, where substantially complete combustion of the fuel is effected; and (9) the hot exhaust gases exiting the catalyst bed are conveyed to the heat exchanger 14 associated with the fuel processor 2.

Once the fuel processor temperature has risen sufficiently to effect and maintain the reformation process: (1) valve 32 is activated to direct air to the cathode side of the fuel cell 22; (2) MeOH and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) air is introduced into the vaporizer 41; (7) liquid methanol is sprayed into the vaporizer 41; (8) the methanol-air mix circulates through the heated vaporizer coil where the MeOH vaporizes; (9) the methanol-air mix along with the cathode effluent 28 then mixes with the anode effluent 26; and (10) the mix is burned on the catalyst bed of the combustor 34.

During normal (i.e., post start-up) operating conditions, the heater 52 is not used as the vaporizer 41 alone vaporizes the MeOH and preheats the MeOH-air mix. Under certain conditions, as described hereafter, the combustor 34 could operate solely on the anode and cathode effluents, without the need for additional MeOH fuel from the vaporizer 41. Under such conditions, MeOH injection to the combustor 34 is discontinued. Under other conditions, e.g., increasing power demands, supplemental fuel is provided to the combustor 34.

As described above, the combustor 34 receives multiple fuels, such as a methanol-air mix as well as anode effluent 26 from the anode of the fuel cell 22.

Oxygen depleted exhaust air 28 from the cathode of the fuel cell 22 and air from the compressor 30 are also supplied to the combustor 34.

According to the present fuel cell example, a controller 150 shown in FIG. 1 controls the operation of the combustor 34. Anode exhaust or effluent plus a liquid fuel, i.e., methanol, if required, support the energy requirements of the combustor 34. An enthalpy balance maintains the desired reaction by temperature controlling the amount of air and/or cathode exhaust supplied to the combustor 34 to meet all fuel processor heat requirements.

It should be noted that the energy requirements of the apparatus components are expressed herein in terms of power. This is for convenience and is meant to express an energy rate, often in units of kilowatts, rather than BTU per second.

The controller 150 may comprise any suitable microprocessor, microcontroller, personal computer, etc., which has central processing unit capable of executing a control program and data stored in a memory. The controller 150 may be a dedicated controller specific to the combustor 34 or implemented in software stored in the main vehicle electronic control module. Further, although the following description describes a software based control program for controlling the combustor 34 in various modes of operation or sequence, it will also be understood that the combustor control can also be implemented in part or whole by dedicated electronic circuitry.

The controller 150 controls the operation of the combustor 34 in five different modes or sequences of operation. The separate modes of operation include (1) combustor start-up, (2) combustor operation during fuel processor warm-up, (3) combustor operation during fuel processor start-up, with the fuel cell off-line, (4) combustor operation during fuel processor run mode with the fuel cell stack on-line, and (5) combustor shutdown.

Further details concerning the construction and operation of the above-described fuel cell apparatus can be had by referring to co-pending U.S. patent application Ser. No. 09/358,080, filed in Jul. 21, 1999, Attorney Docket No. H-202971, in the names of David J. Hart-Predmore and William H. Pettit, and entitled "Methanol Tailgas Combustor Control Method", the entire contents of which are incorporated herein by reference.

Figure 2:
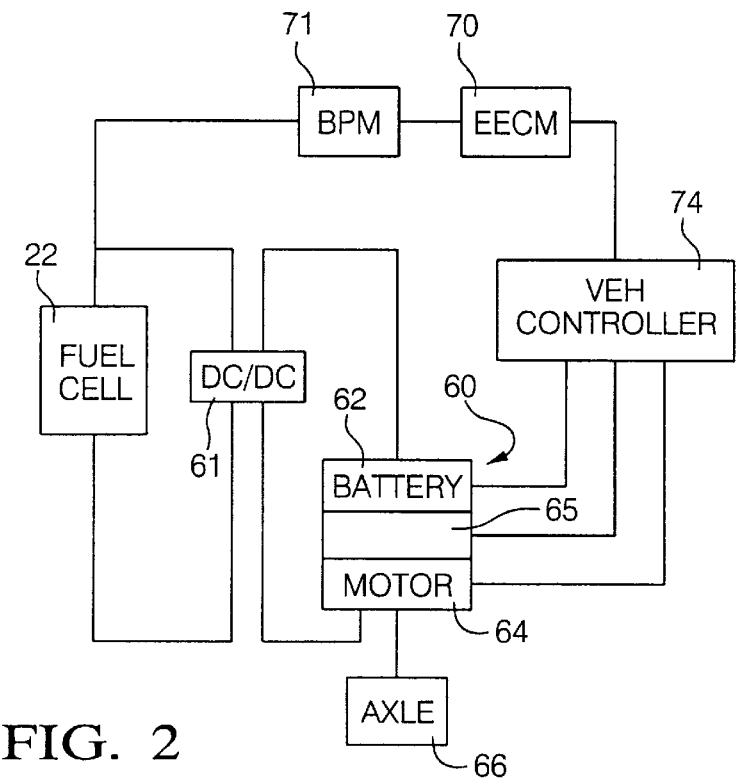
FIG. 2 is a flow diagram of the fuel cell apparatus shown in FIG. 1 connected in a pictorial representation of a use application.

In a preferred embodiment, the fuel cell system includes the fuel cell 22 as part of an external circuit 60 (see FIG. 2) wherein a portion of the external circuit 60, comprises a battery 62, an electric motor 64 and drive electronics 65 constructed and arranged to accept electric energy from a DC/DC converter 61 coupled to the fuel cell 22 and to convert the DC power to mechanical energy from the motor 64. The battery 62 is constructed and arranged to accept and store electrical energy supplied by the fuel cell 22 and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack which is done by the battery pack module 71, for example. The BPM 71 sends an output signal (message) to the vehicle controller 74 based on conditions monitored by the BPM 71. The vehicle controller 74 controls operation of the battery 62, the drive electronics 65 and the electric motor 64 in a conventional manner.

The term "fuel cell" is often used to refer to an individual cell and also may refer to a fuel cell stack which contains many individual fuel cells often on the order of one hundred or more, connected in series. Each cell within the stack includes the membrane electrode assembly (MEA) described earlier, and each such MEA provides its increment of voltage. A group of cells within the stack is referred to as a cluster.

Figure 3:
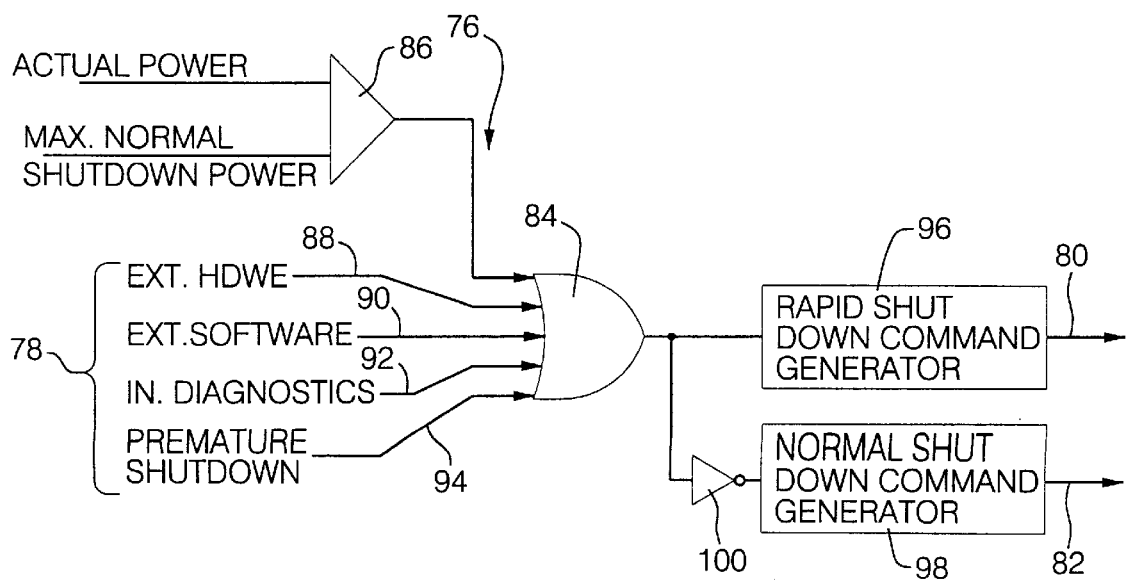
FIG. 3 is a flow diagram depicting a rapid and a normal shutdown control of the present invention.

The controller 150 which may be implemented in the BPM 71 and/or the EECM 70, monitors the operation of fuel cell system with respect to pressures, temperatures, start-up times, cycles, etc., and routinely generates shutdown commands 78 in response to selected transition conditions of the system for transmittal to algorithm logic 76 (see FIG. 3.)

The system shutdown control according to the present invention may be implemented in either hardware or software. Preferably, the control is implemented in software as part of the control program of the controller 150. However, the following description of the control as a logic circuit will be understood to be by convenience only for clarity in illustrating and describing the function of the inventive control.

Logic 76 examines each shutdown command signal 78 received from the controller 150 and makes a determination or differentiation with respect to whether the shutdown command should be viewed as a rapid shutdown command 80 or a normal shutdown command 82. The differentiation involves examining five criterion which are fed or treated as inputs to the software equivalent of an OR gate 84.

The first criterion 86 compares the actual power being generated by the fuel cell 22 to the maximum power that the combustor 34 is capable of processing. If the actual power exceeds the capacity of the combustor 34, a positive or high voltage level appears at the input of the OR gate 84. If the actual power being generated by the fuel cell 22 is less than the capacity of the combustor 34, a negative or low voltage appears at the input of the OR gate 84. Alternatively, the reformate output power, rather than the actual power being generated by the fuel cell, may be used for the comparison. This alternative methodology has the advantage that the fuel cell stack may not consume all of the hydrogen produced by the reformer, but the combustor will see all of the hydrogen produced by the reformer when the load is disconnected.

The second criteria 88 involves examination of the system hardware external to the controller 150. If the external hardware is functioning properly, a negative or low voltage appears at the input of the OR gate 84. If any abnormality is sensed in the external hardware, a high voltage appears at the input to the OR gate 84.

The third criterion 90 involves an examination of the software external to the controller 150. If the external software is functioning properly, a low voltage appears at the input of the OR gate 84, and if an abnormality is sensed in the external software, a high voltage appears at the OR gate input 84.

The fourth criterion 92 involves examining diagnostics internal to the fuel cell system, such as temperatures, pressures, rates of air flow, etc. If all of the diagnostics check out properly, then a low voltage is supplied to the input of the OR gate 84. If an abnormality is detected in any of the sensed diagnostics, then a high voltage is supplied to the input of the OR gate 84.

The fifth criterion 94 concerns premature shutdown of the fuel cell system. This criterion specifically involves monitoring the temperature of the fuel cell stack 22 and determining if the shutdown command has occurred before the fuel cell stack 22 has reached a predetermined normal operating temperature. If the fuel cell temperature has reached the predetermined normal operating temperature before a shutdown command is received, a low voltage appears at the input of the OR gate 84 and if the fuel cell temperature has not reached the normal operating temperature, a high voltage appears at the OR gate 84 input.

If all five of the criterion are satisfied (i.e., the actual power is below the capacity of the combustor 34, the external hardware is functioning properly, the external software is functioning properly, the internal system diagnostics check out properly, and the shutdown command is not occurring before the fuel cell stack 22 has reached a predetermined normal operating temperature) only low voltage appear at the inputs of the OR gate 84 and a low voltage appears at the output of the OR gate 84. This low voltage output is transmitted to a rapid shutdown command generator 96 and to a normal shutdown command generator 98. Rapid shutdown command generator 96 functions, when activated, to generate a rapid shutdown command 80. Normal shutdown command generator 98 functions, when activated, to generate a normal shutdown command 82.

The low voltage output of OR gate 84 appears at the input of rapid shutdown command generator 96 as a "no action" signal so that generator 96 is not activated. However, the low voltage signal is also transmitted to the normal shutdown command generator 98 after passing through an inverter 100 which converts the low voltage to a high voltage. This high voltage signal activates the normal generator 98 to generate a normal shutdown command 82 for transmittal to the fuel cell system.

If, on the other hand, any of the inputs from the five algorithm logic criterion constitute a positive or high voltage to the OR gate 84 (that is, either the actual power being generated by the fuel cell 22 exceeds the capacity of the combustor 34, an abnormality has been detected in the external hardware, an abnormality has been detected in the external software, an abnormality has been detected in the internal system diagnostics, or a shutdown command signal has occurred before the fuel cell stack 22 has reached the predetermined normal operating temperature) then a high voltage appears at the output of the OR gate 84 for transmittal to the rapid shutdown command generator 96 and to the normal generator 98. A high voltage appearing at the input of the rapid shutdown command generator 96 activates the generator to output a rapid shutdown command 80 for transmittal to the fuel cell system. The high voltage signal being transmitted to normal shutdown generator 98 passes through the inverter 100 so that the normal command generator 98 receives a negative or low voltage input and does not generate a normal shutdown command signal 82.

The controller logic 76 thus functions to simply and effectively differentiate between the need for a normal shutdown command and a rapid shutdown command and, specifically, provides a normal shutdown command in all situations where the control has determined that there is no need for a rapid shutdown command.

When a normal shutdown command 82 is received by the fuel processor controller 150, a normal shutdown procedure is instituted involving a step-by-step process of disconnecting the external load from the fuel processor 2, consuming excess hydrogen within the system, and cooling the system down quickly and efficiently. By contrast, upon receipt of a rapid shutdown command 80, it is assumed that conditions are present based on the diagnostics which could derogate the system or produce a serious or undesirable condition and the system is therefore shutdown in a manner which removes energy from the system quickly, primarily by venting the reformate to atmosphere or to storage. Cool down and system efficiency are secondary concerns in a rapid shutdown situation. It will be understood that the criteria to decide which path to take are critical because, if any of the criterion which select the rapid shutdown path are met, and the normal shutdown path is taken, the system could be derogated.

The specific shutdown sequence instituted in response to receipt of a normal shutdown command 82 is as follows:
(1) The supply of MeOH to the combustor 34 is terminated if in use;
(2) the external load 60 is electrically disconnected from the stack 22 and air and reformate are bypassed around the stack 22 via a bypass valve;
(3) the supply of methanol and water to fuel processor 2 is terminated;
(4) ancillary items of the system are shutdown; but a supply of air is maintained to the system from the compressor 30;
(5) the system enters a cool down phase especially with respect to the combustor 34 and fuel processor 2; and
(6) (optionally) the system is purged with $N_2$ to replace $H_2$ in the stack 22.

Note that the logic 76 remains operational during steps 1–4 of the normal shutdown sequence and if a change occurs in the condition of the signal being received from external hardware monitor 88, external software monitor 90, or internal diagnostics monitor 92, a normal shutdown sequence is avoided and a rapid shutdown sequence is initiated.

The sequence instituted in response to the receipt of a rapid shutdown command 80 is as follows:
(1) The external load 60 is electrically disconnected from the fuel cell stack;
(2) the supply of methanol and water to the fuel processor is terminated and the supply of methanol to the combustor is terminated;
(3) a vent valve is opened to dump fuel cell exhaust gases 26 to atmosphere or to storage;
(4) (optionally) the system is purged with $N_2$ to replace hydrogen in the stack 22 (effectively, steps 1–4 occur simultaneously); and
(5) the system enters a cool down phase, especially with respect to the combustor 34 and fuel processor 2.

Note that the important distinction between the action taken in response to a normal shutdown command 82 and a rapid shutdown command 80 involves the disposition of exhaust gases 26. In a normal shutdown command, where it has been determined that the combustor capacity is able to handle the volume of exhaust anode gases 26 being delivered from the fuel cell 22 to the combustor 34, the exhaust gases 26 continue to flow into the combustor 34 in a normal manner for consumption in the combustor 34. By contrast, upon receipt of a rapid shutdown command, a vent valve is opened so that the exhaust gases 26, which have been determined to exceed the capacity of the combustor 34, are dumped from the system and routed either to atmosphere or storage.

The invention methodology will be seen to provide a ready and efficient means of differentiating between the need for a normal shutdown and a rapid shutdown command. Specifically, the invention methodology insures that a normal shutdown command will be generated in all situations where no rapid shutdown conditions exist, whereby to maximize the use of the normal shutdown procedure with its inherent low stress and efficiency, and yet insures that the rapid shutdown command will be generated in all situations where the rapid procedure is justified or required, thereby insuring that derogation to the system will be avoided and undesirable system conditions will not be allowed to be created or persist.

What is claimed is:

1. A method of controlling the operation of a fuel cell system which supplies a hydrogen-rich stream to a fuel cell stack wherein the hydrogen stream reacts with oxygen to supply electrical power to an external load, the method comprising:

establishing a normal shut down procedure for the system in which the load is disconnected from the hydrogen stream;

establishing a rapid shut down procedure for the system in which the hydrogen stream is removed from the system;

providing system monitoring means operative to generate system shutdown commands;

providing a control receiving the shutdown commands, the control operatively subjecting the shutdown commands to shutdown logic and generate either a normal shutdown command or a rapid shutdown command; and implementing the normal shutdown procedure in response to generation of the normal shutdown command and implementing the rapid shutdown procedure in response to generation of the rapid shutdown command.

2. A method according to claim 1 wherein the step of subjecting the shutdown command to shut down logic comprises subjecting the shutdown command to a plurality of criterion each corresponding to a rapid shutdown scenario.

3. A method according to claim 2 wherein one criterion comprises comparing the electrical power being supplied to the external load to a reference power related to the capacity of the system to consume hydrogen.

4. A method according to claim 3 wherein:

the system includes a combustor receiving exhaust from the fuel cell stack; and the reference power is related to the capacity of the combustor to process the exhaust gasses being received from the fuel cell stack.

5. A method according to claim 2 wherein:

the monitoring means includes means diagnosing conditions of the system and generating diagnostic signals in response to sensed system abnormalities; and one criterion comprises checking for the presence of diagnostic signals indicative of system abnormalities.

6. A method according to claim 2 wherein one criterion comprises checking for external software or external hardware abnormalities.

7. A method according to claim 2 wherein one criterion includes monitoring the temperature of the fuel cell stack and determining if the shutdown command occurs before the fuel cell stack has reached a predetermined normal operating temperature.

8. A method according to claim 1 wherein the step of removing the hydrogen stream from the system comprises dumping the hydrogen stream to atmosphere.

9. A method according to claim 1 wherein the step of removing the hydrogen stream from the system comprises routing the hydrogen stream to a storage facility.

10. A method according to claim 1 wherein the step of disconnecting the load from the system comprises interrupting the supply of electrical power to the load.

11. A method of controlling the operation of a fuel cell system having a fuel processor which supplies a hydrogen-rich stream to fuel cell stack wherein the hydrogen stream reacts with oxygen to supply electrical power to an external load, the method comprising:

establishing a normal shutdown procedure for the system in which the load is disconnected from the hydrogen stream;

establishing a rapid shutdown procedure for the system in which the hydrogen stream is removed from the system;

providing system monitoring means operative to generate system shutdown commands;

subjecting each shutdown command to decision logic based on selected system criterion;

generating either a normal shutdown command or a rapid shutdown command depending on the status of the selected criterion; and implementing the normal shutdown procedure in response to generation of the normal shutdown command and implementing the rapid shutdown procedure in response to generation of the rapid shutdown command.

12. A method according to claim 11 wherein:

the logic generates a positive or a negative indicator for each criterion; and the logic functions to provide a rapid shutdown command if one or more positive indicators are generated and a normal shutdown command if no positive indicators are generated.

13. A method according to claim 11 wherein one criterion comprises comparing the voltage of the electrical power being supplied to the load by the fuel cell stack to a reference voltage related to the capacity of the system to consume hydrogen.

14. A method according to claim 11 wherein one criterion comprises comparing the output power of the fuel processor to a reference voltage related to the capacity of the system to consume hydrogen.

15. A method according to claim 13 wherein:

the system includes a combustor receiving exhaust from the fuel cell stack; and the reference voltage is related to the capacity of the combustor to process the exhaust gasses being received from the fuel cell stack.

16. A method according to claim 14 wherein:

the system includes a combustor receiving exhaust from the fuel cell stack; and the reference voltage is related to the capacity of the combustor to process the exhaust gasses being received from the fuel cell stack.

17. A method according to claim 11 wherein:

the system includes means monitoring and diagnosing conditions of the system and generating diagnostic signals in response to sensed system abnormalities; and one criterion comprises checking for the presence of diagnostic signals indicative of system abnormalities.

18. A method according to claim 11 wherein one criterion comprises checking for external software or external hardware abnormalities.

19. A method according to claim 11 wherein one criterion includes monitoring the temperature of the fuel cell stack and determining if the shutdown command occurs before the fuel cell stack has reached a predetermined temperature.

20. A method according to claim 11 wherein the step of removing the hydrogen stream from the system comprises dumping the hydrogen stream to atmosphere.

21. A method according to claim 11 wherein the step of removing the hydrogen stream from the system comprises routing the hydrogen stream to a storage facility.

22. A method according to claim 11 wherein the step of disconnecting the load from the system comprises interrupting the supply of electrical power to the load from the fuel cell stack.

* * * * *